(12) United States Patent
Perrin et al.

(10) Patent No.: US 7,578,129 B2
(45) Date of Patent: Aug. 25, 2009

(54) MULTIPLE-TURBOCHARGER SYSTEM, AND EXHAUST GAS FLOW CONTROL VALVE THEREFOR

(75) Inventors: Jean-Luc Perrin, Girmont (FR); Philippe Renaud, Sanchey (FR); Yannick Prebost, Charmes (FR)

(73) Assignee: Honeywell International, Inc., Morristown, NJ (US)

( * ) Notice: Subject to any disclaimer, the term of this patent is extended or adjusted under 35 U.S.C. 154(b) by 49 days.

(21) Appl. No.: 11/852,836

(22) Filed: Sep. 10, 2007

(65) Prior Publication Data

US 2009/0064678 A1 Mar. 12, 2009

(51) Int. Cl.
*F02B 33/44* (2006.01)
*F16K 51/00* (2006.01)
(52) U.S. Cl. .................. 60/612; 251/117; 137/513.7
(58) Field of Classification Search .......... 60/612; 251/117; 137/513.7
See application file for complete search history.

(56) References Cited

U.S. PATENT DOCUMENTS

| | | | | | |
|---|---|---|---|---|---|
| 192,642 | A | * | 7/1877 | Eckert | 251/117 |
| 1,506,434 | A | * | 8/1924 | Leins | 251/117 |
| 3,303,746 | A | * | 2/1967 | Schmoeger | 251/117 |
| 4,373,336 | A | * | 2/1983 | Horler et al. | 60/606 |
| 4,632,358 | A | * | 12/1986 | Orth et al. | 251/117 |
| 4,691,861 | A | * | 9/1987 | Sliger et al. | 251/117 |
| 5,673,980 | A | * | 10/1997 | Schwarz et al. | 251/117 |
| 5,740,810 | A | * | 4/1998 | Johnson et al. | 251/117 |
| 6,378,308 | B1 | | 4/2002 | Pfluger | |
| 6,543,228 | B2 | * | 4/2003 | Deacon | 60/602 |

FOREIGN PATENT DOCUMENTS

| | | | |
|---|---|---|---|
| DE | 102004051486 A1 | * | 1/2006 |
| WO | 2004/067932 | | 8/2004 |
| WO | 2007/024226 | | 3/2007 |

* cited by examiner

*Primary Examiner*—Thomas E Denion
*Assistant Examiner*—Mary A Davis
(74) *Attorney, Agent, or Firm*—Alston & Bird

(57) ABSTRACT

A multiple-turbocharger system for an internal combustion engine includes a first turbocharger comprising a first compressor driven by a first turbine, the first turbine operable to be driven by exhaust gas from the engine; a second turbocharger comprising a second compressor driven by a second turbine, the second turbine operable to be driven by exhaust gas from the engine; a first conduit arranged for supplying exhaust gas from the engine to the first turbine, and a second conduit arranged for supplying exhaust gas from the engine to the second turbine; and a valve coupled with the second conduit and switchable between an open condition allowing exhaust gas flow from the second conduit to the second turbine, and a closed condition substantially preventing exhaust gas flow from the second conduit to the second turbine but allowing a leakage flow to the second turbine sufficient to keep the second turbine rotating.

13 Claims, 2 Drawing Sheets

MULTIPLE-TURBOCHARGER SYSTEM, AND EXHAUST GAS FLOW CONTROL VALVE THEREFOR

BACKGROUND OF THE INVENTION

Figure 1:
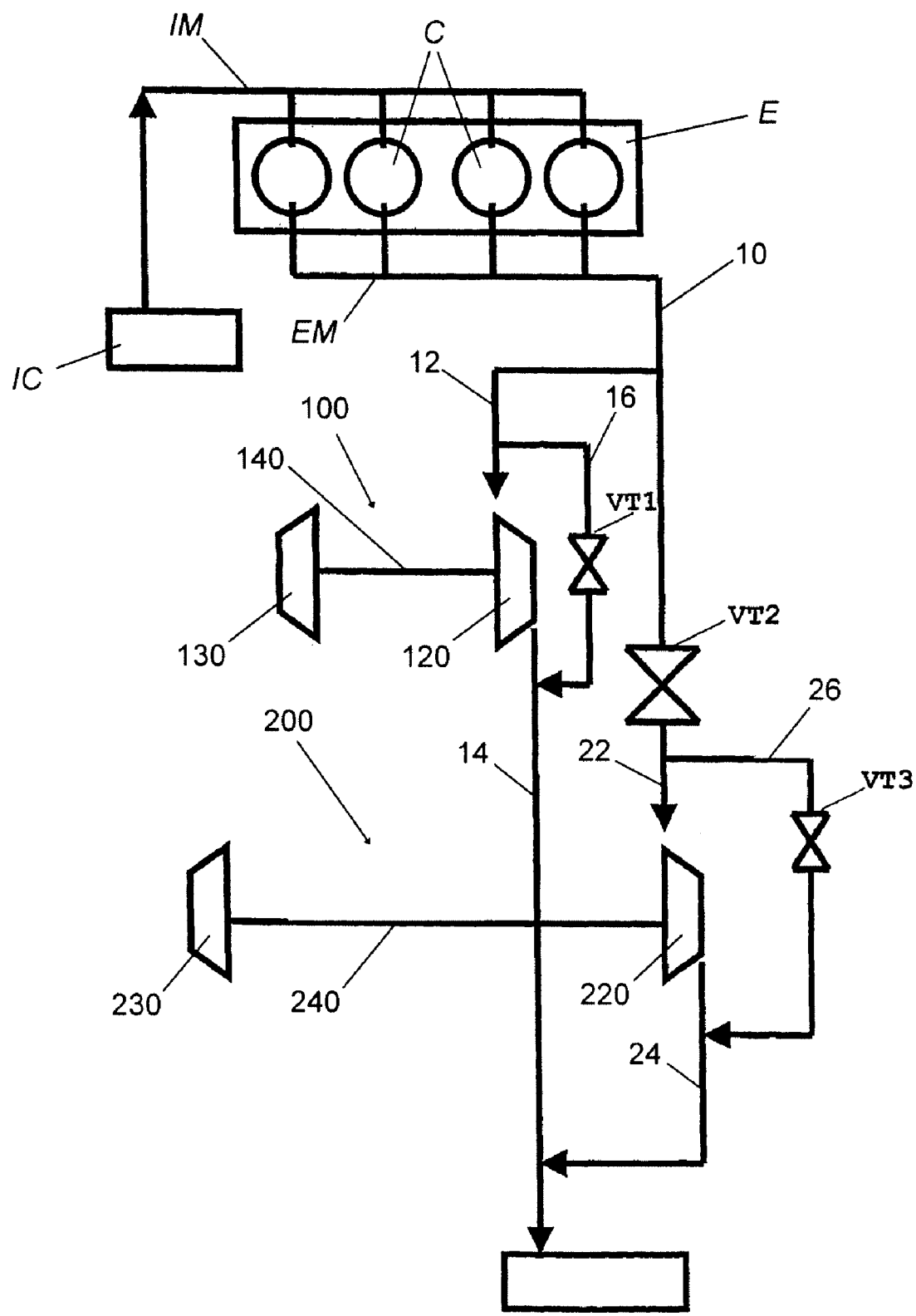

The present disclosure relates to a valve for controlling flow of exhaust gas to a turbocharger in a multiple-turbocharger system for an internal combustion engine.

In a multiple-turbocharger system for an internal combustion engine, such as the twin-turbocharger system described for example in WO 2004/067932, the entire disclosure of which is incorporated herein by reference, there is frequently a need or desire to be able to selectively prevent or allow exhaust gas to pass through the turbine of a given turbocharger of the system, such that during some operating conditions exhaust gas is passed through the turbines of all of the turbochargers, and during other operating conditions exhaust gas is passed through the turbine of only one of the turbochargers.

Various designs for exhaust gas flow control valves have been proposed. The present disclosure is directed to such a valve for a multiple-turbocharger system, having unique construction and operational characteristics for enhancing the operability of the multiple-turbocharger system.

BRIEF SUMMARY OF THE DISCLOSURE

In accordance with one aspect of the present disclosure, a valve is provided that has the capability of always allowing exhaust gas flow therethrough, even when the valve is "closed", such that whenever the engine is running, the turbine of the turbocharger that is "closed" to exhaust gas still receives a small exhaust gas flow to keep the turbocharger rotating at a low speed. This is helpful in reducing oil seal problems that can result from the turbocharger being completely stopped while oil is being circulated through its bearing area.

In accordance with one embodiment, the valve comprises a housing having an inlet port, an outlet port, and a cavity in fluid communication with the inlet and outlet ports; a valve seat disposed in the cavity; a valve member disposed in the cavity and movable relative to the valve seat between (a) a closed position engaging the valve seat so as to prevent flow from the inlet port, between the valve member and valve seat, to the outlet port, and (b) an open position allowing flow from the inlet port, between the valve member and valve seat, to the outlet port; and a leakage pathway extending from the inlet port between the valve seat and the housing to the outlet port, such that even when the valve member is in the closed position, exhaust gas flows from the inlet port through the leakage pathway to the outlet port.

The valve seat in one embodiment is formed separately from the housing and is installed in the cavity of the housing. The valve seat is generally tubular in configuration, having a radially outer surface and a radially inner surface, and a portion of the leakage pathway is defined between the radially outer surface of the valve seat and an inner surface of the housing. Additionally, a portion of the leakage pathway can be defined between an end surface of the valve seat and an opposing surface of the housing. The valve member can be translatable in a direction parallel to an axis of the tubular valve seat to move between the open and closed positions, and the end surface of the valve seat and the opposing surface of the housing can be generally perpendicular to the axis.

In one embodiment, the valve member has a radially outer surface opposed to the radially inner surface of the valve seat, and a seal is arranged between the radially outer surface of the valve member and the radially inner surface of the valve seat. These opposing surfaces are generally cylindrical such that the valve member is axially slidable relative to the valve seat, the seal preventing flow between the radially outer surface of the valve member and the radially inner surface of the valve seat. The valve seat includes at least one aperture extending therethrough from the radially outer surface to the radially inner surface of the valve seat for exhaust gas flow when the valve member is in the open position.

Advantageously, the valve seat and valve member can form a cartridge and the cavity in the housing can be configured such that the cartridge is axially insertable into the cavity from one end of the housing until an axially facing surface on the cartridge abuts an oppositely axially facing surface of the housing.

The present disclosure is further directed to a multiple-turbocharger system for an internal combustion engine, comprising:

a first turbocharger comprising a first compressor driven by a first turbine, the first turbine operable to be driven by exhaust gas from the engine;

a second turbocharger comprising a second compressor driven by a second turbine, the second turbine operable to be driven by exhaust gas from the engine;

a first conduit arranged for supplying exhaust gas from the engine to the first turbine, and a second conduit arranged for supplying exhaust gas from the engine to the second turbine; and a valve coupled with the second conduit and switchable between an open condition allowing exhaust gas flow from the second conduit to the second turbine, and a closed condition substantially preventing exhaust gas flow from the second conduit to the second turbine but allowing a leakage flow to the second turbine sufficient to keep the second turbine rotating.

BRIEF DESCRIPTION OF THE SEVERAL VIEWS OF THE DRAWING(S)

Figure 2:
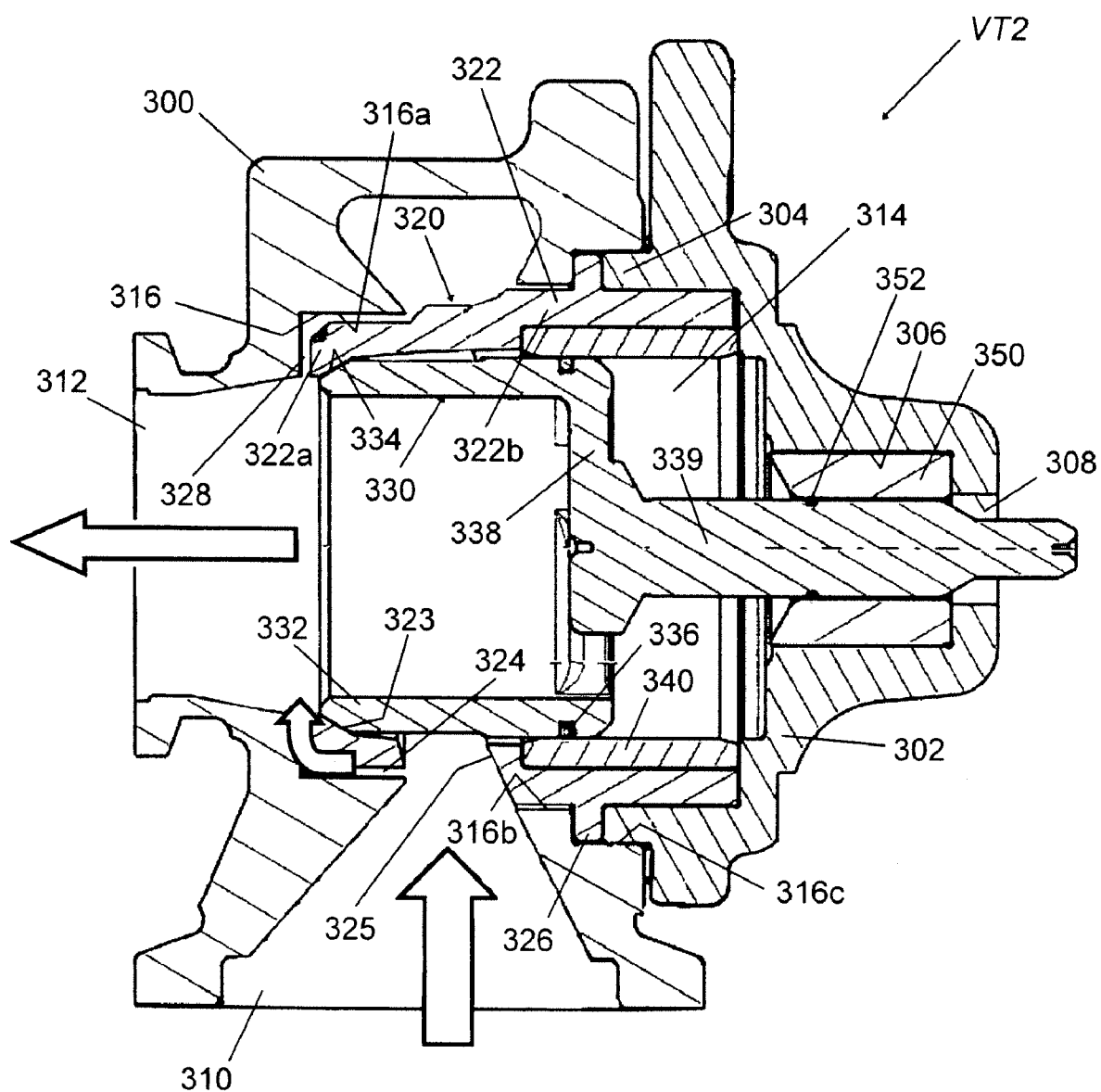

Having thus described the disclosure in general terms, reference will now be made to the accompanying drawings, which are not necessarily drawn to scale, and wherein:

FIG. 1 is a diagrammatic representation of a multiple-turbocharger system in accordance with one embodiment of the invention; and FIG. 2 is a cross-sectional view through a valve in accordance with one embodiment of the invention.

DETAILED DESCRIPTION OF THE DRAWINGS

The present invention now will be described more fully hereinafter with reference to the accompanying drawings in which some but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

A turbocharged engine system in accordance with one embodiment of the invention is shown in FIG. 1. The cylinders C of the internal combustion engine E receive combustion air via an intake manifold IM. The combustion air can be cooled in an intercooler IC prior to the intake manifold, if desired. The cylinders also receive fuel, either mixed with the combustion air prior to the intake manifold or separately injected into the cylinders by fuel injectors (not shown), and the fuel-air mixture is combusted in the cylinders, producing exhaust gases that are discharged from the cylinders into one or more exhaust manifolds EM.

The stream of exhaust gas from the engine drives a first turbocharger 100 and a second turbocharger 200. The first turbocharger includes a first turbine 120 and a first compressor 130 connected to each other by a first shaft 140 such that rotation of the first turbine 120 causes the first shaft 140 to rotate, which in turn causes the first compressor 130 to rotate and to compress a stream of air supplied to it for delivery to the intake manifold IM of the engine. Likewise, the second turbocharger includes a second turbine 220 and a second compressor 230 connected to each other by a second shaft 240 such that rotation of the second turbine 220 causes the second shaft 240 to rotate, which in turn causes the second compressor 230 to rotate and to compress a stream of air supplied to it for delivery to the intake manifold IM of the engine. FIG. 1 depicts only the exhaust gas side of the turbocharger system, but it will be understood that there is a system of air conduits for supplying air to each compressor, and for feeding air compressed by the compressors to the intake manifold (or optionally to the intercooler IC, from which the air is then supplied to the intake manifold).

The turbine side of the system includes a main exhaust gas line 10 that carries exhaust gas from the exhaust manifold EM, and a first conduit 12 that branches off from the main exhaust gas line 10 and supplies exhaust gas to the first turbine 120. Exhaust gas that has passed through the first turbine is discharged through a first turbine discharge line 14. A bypass line 16 connects between the first conduit 12 upstream of the first turbine 120 and the discharge line 14 downstream of the first turbine for bypassing exhaust gas around the first turbine whenever a bypass valve VT1 arranged in the bypass passage is open.

Exhaust gas carried in the main exhaust gas line 10 that does not pass through the first conduit 12 is carried by the main gas line through a flow control valve VT2 to a second conduit 22 that supplies the gas to the second turbine 220. Exhaust gas that has passed through the second turbine is discharged through a second turbine discharge line 24. A bypass line 26 connects between the second conduit 22 upstream of the second turbine 220 and the discharge line 24 downstream of the second turbine for bypassing exhaust gas around the second turbine whenever a bypass valve VT3 arranged in the bypass passage is open.

In accordance with the invention, the valve VT2 is configured so that even when it is in its closed position for substantially preventing exhaust gas flow to the second turbine 220, a small amount of "leakage" flow passes through the valve to the second turbine. The leakage flow is calibrated, by suitably configuring the valve, such that the flow is sufficient to keep the second turbine rotating at a low rate, even though the second turbine is effectively inactive in terms of driving the second compressor 230 to provide boost to the engine. In such conditions, the boost is provided solely by the first compressor 130, which is driven by the first turbine 120. Thus, when the valve VT2 is closed to deactivate the second turbocharger 200, substantially all of the exhaust gas from the main exhaust gas line 10 passes either through the first conduit 10 and through the first turbine 120, or through the bypass line 16, to the discharge line 14, except for the small leakage flow that passes through the second turbine to the discharge line 24.

FIG. 2 depicts a valve VT2 in accordance with one embodiment of the invention. The valve includes a housing 300 having an inlet port 310, an outlet port 312, and a cavity 314 in fluid communication with the inlet and outlet ports. The cavity 314 is formed as a generally cylindrical bore 316 having a cylindrical first bore portion 316a, a cylindrical second bore portion 316b of larger diameter than the first bore portion and axially spaced therefrom, and a cylindrical third bore portion 316c of larger diameter than the second bore portion and axially spaced therefrom.

The valve further includes a cartridge 320 installed in the bore 316. The cartridge includes a generally tubular valve seat 322. The valve seat includes a first portion 322a that resides in the first bore portion 316a and whose outside diameter is smaller than the diameter of the first bore portion 316a of the housing such that there is a radial clearance 324 therebetween. The valve seat also includes a second portion 322b that resides in the second and third bore portions 316b,c and whose outside diameter is larger than that of the first portion 322a but smaller than the second and third bore portions such that there is a clearance therebetween. the valve seat also includes a radially outwardly projecting shoulder or ring 326 that extends out from the second portion 322b and that is configured to abut an axially facing surface of the housing 310 created by the step between the second bore portion 322b and third bore portion 322c. This abutment between the ring 326 and the housing limits how far the valve seat extends into the bore 316 in the housing, such that an axial clearance 328 exists between the end of the valve seat and an opposing inner surface of the cavity in the housing.

The cartridge 320 further comprises a valve member 330 that is received within the open interior of the tubular valve seat 320. The valve member has a generally tubular portion 332 whose distal end defines a generally conical outer surface 334 sized in diameter to sealingly abut a generally conical inner surface 323 of the first portion 322a of the valve seat. A tubular liner 340 is secured (such as by press-fitting) within the second portion 322b of the valve seat. The liner has an inside diameter smaller than that of most of the valve seat 322, except for the conical inner surface 323, and a proximal end of the tubular portion 332 of the valve member has an outside diameter slightly smaller than the inside diameter of the liner 340. A seal ring 336 is retained in a groove in the outer surface of the proximal end of the tubular portion 332 and sealingly engages the inner surface of the liner 340 such that the valve member 330 can translate relative to the valve seat 320 along an axis of the valve seat, and the seal ring 336 maintains a seal between the valve member and valve seat so as to prevent exhaust gas from flowing therebetween. The liner helps to thermally decouple the valve member 330 and its seal ring 336 from the valve seat 320, which helps ensure reliability of the seal ring. The liner also can be made of a different material from the valve seat, and in particular can be a low-friction material. Making the liner separate from the valve seat also can help minimize thermal distortion of the surface that outer surface of the valve member opposes, which in turn allows the clearance between these surfaces to be minimized, such that the leakage flow that the seal ring 336 has to retain can be minimized.

The valve member 330 is movable relative to the valve seat 320 between a closed position (as shown in FIG. 2) engaging the valve seat so as to prevent flow from the inlet port 310, between the valve member and valve seat, to the outlet port 312, and an open position allowing flow from the inlet port, between the valve member and valve seat, to the outlet port. When the valve member is in the open position, such flow of exhaust gas is possible because the valve seat 320 includes one or more apertures 325 through its side wall, through which exhaust gas from the inlet port 310 can flow into the interior of the valve seat and then through the outlet port 312. When the valve member is moved to its closed position, it covers the aperture 325, and engagement between the conical surfaces 323, 334 substantially prevents such flow of exhaust gas.

The valve member 330 includes a disk-shaped portion 338 joined to the proximal end of the tubular portion 332, and a rod portion 339 joined to the disk-shaped portion and extending axially therefrom. The valve includes a housing cover 302 having a generally annular or cylindrical portion 304 that fits closely into the third bore portion 316c of the housing 300 and abuts the ring 326 of the valve seat 322. The housing cover 302 is secured to the housing 300 in suitable fashion such that the valve seat is secured within the housing. The housing cover 302 defines a bore 306 that receives a tubular bushing 350 through which the rod portion 339 of the valve member 330 extends. A seal ring 352 is disposed between the outer surface of the rod portion 339 and the inner surface of the bushing 350. An end of the rod portion 339 extends through a hole 308 in the housing cover 302 such that it can be connected to a suitable actuator for moving the valve member between its open and closed positions.

In accordance with the invention, a leakage pathway extends from the inlet port 310, through the clearances 324 and 328 between the valve seat 322 and the housing 300, to the outlet port 312. Accordingly, even when the valve member is in the closed position, exhaust gas flows from the inlet port through the leakage pathway to the outlet port.

By properly configuring the valve and selecting the dimensions of the clearances 324, 328, the valve can be "calibrated" such that a desired amount of leakage flow through the valve occurs under predetermined operating conditions. The leakage flow desirably should be sufficient to keep the second turbine 220 rotating at a low rate to prevent oil sealing problems in the second turbocharger 200 that can occur if the turbocharger is stationary while oil from the engine oil system is being circulated through its bearing area.

Thus, in accordance with the invention, when the engine is operating at low speed and the second turbocharger 200 is not needed for providing the desired amount of boost to the engine, the valve VT2 is closed, which effectively takes the second turbocharger out of operation. However, the leakage flow through the valve to the turbine 220 keeps the second turbocharger rotating enough to prevent the oil seals in the second turbocharger from leaking or degrading.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A valve for regulating flow of exhaust gas to a turbocharger in a multiple-turbocharger system, comprising:
    a housing having an inlet port for receiving exhaust gas from an internal combustion engine, an outlet port through which exhaust gas is discharged for supply to a turbocharger, and a cavity in fluid communication with the inlet and outlet ports;
    a valve seat disposed in the cavity, the valve seat being generally tubular and having a radially outer surface and a radially inner surface, the valve seat including at least one aperture extending therethrough from the radially outer surface to the radially inner surface;
    a valve member disposed in the cavity and axially slidable relative to the valve seat between (a) a closed position engaging the valve seat so as to prevent flow of exhaust gas between the valve member and valve seat to the outlet port, and (b) an open position allowing flow of exhaust gas between the valve member and valve seat to the outlet port;
    a leakage pathway extending from the inlet port between the valve seat and the housing to the outlet port, such that even when the valve member is in the closed position, exhaust gas entering the inlet port flows through the leakage pathway to the outlet port, a portion of the leakage pathway being defined between the radially outer surface of the valve seat and an inner surface of the housing; and
    a seal arranged between a radially outer surface of the valve member and the radially inner surface of the valve seat such that the seal prevents flow between the radially outer surface of the valve member and the radially inner surface of the valve seat.

2. The valve of claim 1, wherein the valve seat is formed separately from the housing and is installed in the cavity.

3. The valve of claim 2, wherein a portion of the leakage pathway is defined between an end surface of the valve seat and an opposing surface of the housing.

4. The valve of claim 3, wherein the end surface of the valve seat and the opposing surface of the housing are generally perpendicular to the axis.

5. The valve of claim 1, wherein the valve member includes a generally tubular portion having the radially outer surface and having a radially inner surface.

6. The valve of claim 2, wherein the valve seat and valve member form a cartridge and the cavity in the housing is configured such that the cartridge is axially insertable into the cavity from one end of the housing until an axially facing surface on the cartridge abuts an oppositely axially facing surface of the housing.

7. A turbocharger system for an internal combustion engine, comprising:
    a first turbocharger comprising a first compressor driven by a first turbine, the first turbine operable to be driven by exhaust gas from the engine;
    a second turbocharger comprising a second compressor driven by a second turbine, the second turbine operable to be driven by exhaust gas from the engine;
    a first conduit arranged for supplying exhaust gas from the engine to the first turbine, and a second conduit arranged for supplying exhaust gas from the engine to the second turbine; and
    a valve coupled with the second conduit and switchable between an open condition allowing exhaust gas flow from the second conduit to the second turbine, and a closed condition substantially preventing exhaust gas flow from the second conduit to the second turbine but allowing a leakage flow to the second turbine sufficient to keep the second turbine rotating, wherein the valve comprises:
    a housing having an inlet port, an outlet port, and a cavity in fluid communication with the inlet and outlet ports;
    a valve seat disposed in the cavity;
    a valve member disposed in the cavity and movable relative to the valve seat between (a) a closed position engaging the valve seat so as to prevent flow of exhaust gas between the valve member and valve seat to the outlet port, and (b) an open position allowing flow of exhaust gas between the valve member and valve seat to the outlet port; and a leakage pathway extending from the inlet port between the valve seat and the housing to the outlet port, such that even when the valve member is in the closed position, exhaust gas entering the inlet port flows through the leakage pathway to the outlet port.

8. The turbocharger system of claim 7, wherein the valve seat is formed separately from the housing and is installed in the cavity, and wherein the valve seat is generally tubular in configuration, having a radially outer surface and a radially inner surface, and a portion of the leakage pathway is defined between the radially outer surface of the valve seat and an inner surface of the housing.

9. The turbocharger system of claim 8, wherein a portion of the leakage pathway is defined between an end surface of the valve seat and an opposing surface of the housing.

10. The turbocharger system of claim 9, wherein the valve member is translatable in a direction parallel to an axis to move between the open and closed positions, and the end surface of the valve seat and the opposing surface of the housing are generally perpendicular to the axis.

11. The turbocharger system of claim 8, wherein the valve member has a radially outer surface, and a seal is arranged between the radially outer surface of the valve member and the radially inner surface of the valve seat such that the valve member is axially slidable relative to the valve seat, the seal preventing flow between the radially outer surface of the valve member and the radially inner surface of the valve seat.

12. The turbocharger system of claim 11, wherein the valve member includes a generally tubular portion having the radially outer surface and having a radially inner surface.

13. The turbocharger system of claim 8, wherein the valve seat and valve member form a cartridge and the cavity in the housing is configured such that the cartridge is axially insertable into the cavity from one end of the housing until an axially facing surface on the cartridge abuts an oppositely axially facing surface of the housing.

* * * * *